(12) United States Patent
Choi et al.

(10) Patent No.: US 10,063,684 B2
(45) Date of Patent: Aug. 28, 2018

(54) WEARABLE DEVICE, WEARABLE DEVICE SYSTEM AND METHOD FOR CONTROLLING WEARABLE DEVICE

(71) Applicant: INNOMDLE LABORATORY CO., LTD., Suwon-si (KR)

(72) Inventors: Hyun Chul Choi, Yongin-si (KR); Tae Hyun Yoon, Suwon-si (KR); Byeong Yong Jeon, Suwon-si (KR)

(73) Assignee: Innomdle Laboratory Co., Ltd., Suwon-si (KR)

( * ) Notice: Subject to any disclaimer, the term of this patent is extended or adjusted under 35 U.S.C. 154(b) by 0 days.

(21) Appl. No.: 15/612,022

(22) Filed: Jun. 2, 2017

(65) Prior Publication Data

US 2017/0289330 A1    Oct. 5, 2017

Related U.S. Application Data

(62) Division of application No. 15/164,327, filed on May 25, 2016, now Pat. No. 9,706,037.

(30) Foreign Application Priority Data

Nov. 24, 2015   (KR) .......................... 10-2015-0164761

(51) Int. Cl.
| | | |
|---|---|---|
| *H04B 1/38* | (2015.01) | |
| *H04M 1/725* | (2006.01) | |
| *G10L 25/12* | (2013.01) | |
| *G10L 25/15* | (2013.01) | |
| *G10L 25/93* | (2013.01) | |

(Continued)

(52) U.S. Cl.
CPC .......... *H04M 1/7253* (2013.01); *G06F 1/163* (2013.01); *G10L 25/12* (2013.01); *G10L 25/15* (2013.01); *G10L 25/93* (2013.01); *H04B 13/005* (2013.01); *H04M 1/6041* (2013.01);

(Continued)

(58) Field of Classification Search
None
See application file for complete search history.

(56) References Cited

U.S. PATENT DOCUMENTS

| | | | | |
|---|---|---|---|---|
| 6,912,287 B1 * | 6/2005 | Fukumoto | ............... | G06F 1/163 379/430 |
| 2016/0183012 A1 * | 6/2016 | Pedersen | .............. | H04R 25/505 381/315 |

FOREIGN PATENT DOCUMENTS

| | | |
|---|---|---|
| CN | 104247453 A | 12/2014 |
| CN | 104994457 A | 10/2015 |

(Continued)

OTHER PUBLICATIONS

International Search Report from corresponding International Application No. PCT/KR2015/012786, dated Jul. 22, 2016, 3 pages.

*Primary Examiner* — Suhail Khan
(74) *Attorney, Agent, or Firm* — Snyder, Clark, Lesch & Chung, LLP

(57) ABSTRACT

A wearable device comprising: a band unit; and a vibration generating unit coupled to the band unit. The band unit comprises a communication unit receiving a first signal by a predetermined communication method and a control unit determining an amplification extent of the first signal received from the communication unit and generating a second signal based on the determined amplification extent, and the vibration generating unit receives the second signal from the control unit and generates a vibration corresponding to the second signal.

18 Claims, 26 Drawing Sheets

(51) Int. Cl.
*H04M 1/60* (2006.01)
*H04M 9/08* (2006.01)
*G06F 1/16* (2006.01)
*H04B 13/00* (2006.01)
*H04M 19/04* (2006.01)

(52) U.S. Cl.
CPC ....... *H04M 1/72569* (2013.01); *H04M 9/085* (2013.01); *H04M 19/04* (2013.01)

(56) References Cited

FOREIGN PATENT DOCUMENTS

| | | | |
|---|---|---|---|
| JP | 2000078497 A | 3/2000 |
| JP | 2005354295 A | 12/2005 |
| JP | 2014207584 A | 10/2014 |
| KR | 1020120051898 A | 5/2012 |
| KR | 1020150041443 A | 4/2015 |

\* cited by examiner

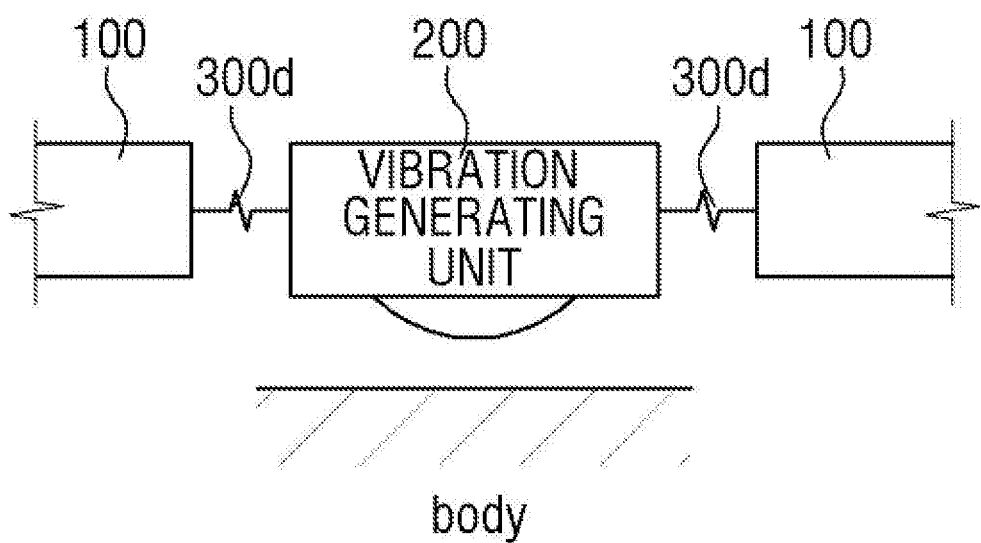

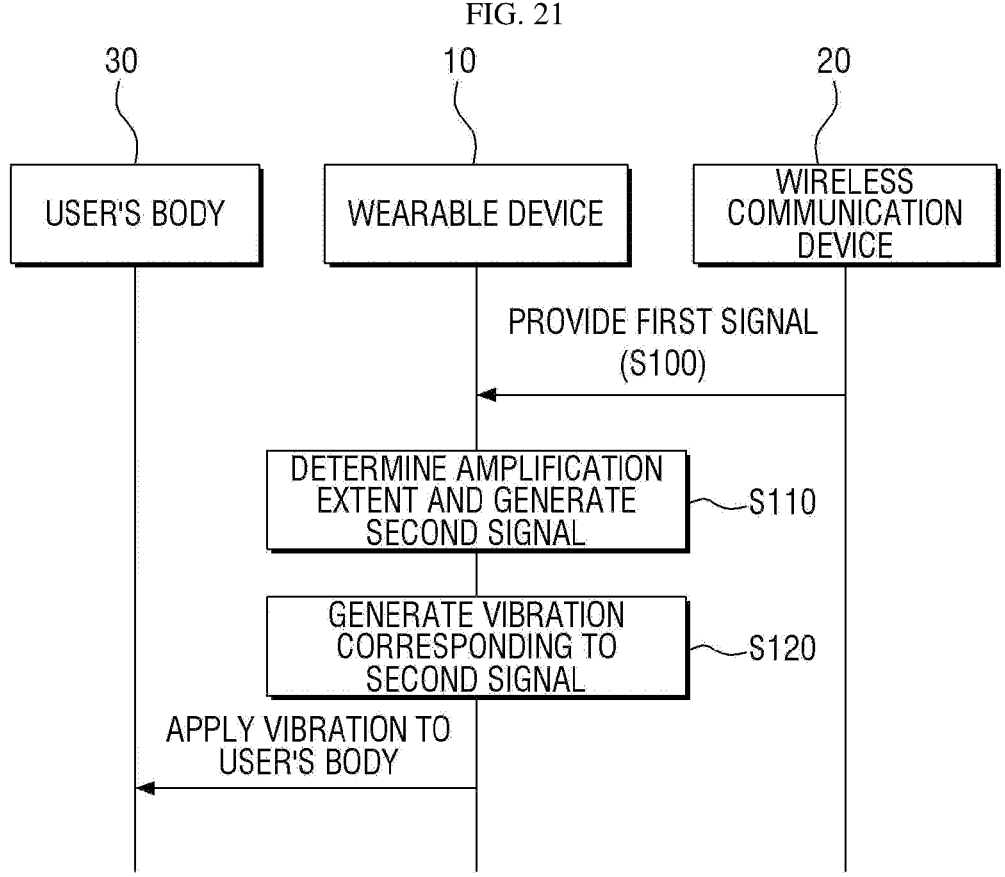

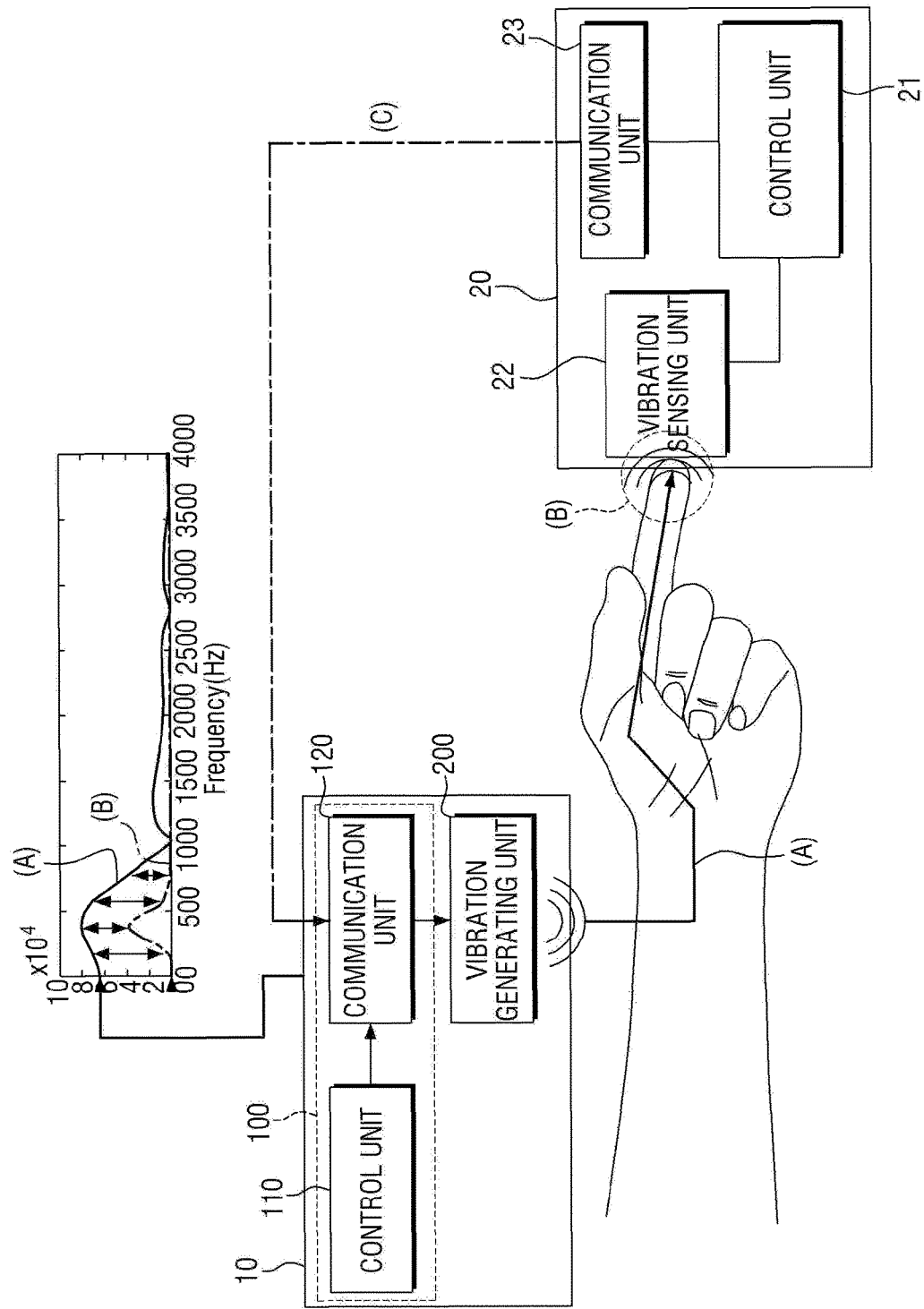

WEARABLE DEVICE, WEARABLE DEVICE SYSTEM AND METHOD FOR CONTROLLING WEARABLE DEVICE

CROSS-REFERENCE TO RELATED APPLICATION

This application is a divisional of U.S. patent application Ser. No. 15/164,327, filed May 25, 2016, which claims priority from and the benefit of Korean Patent Application No. 10-2015-0164761, filed on Nov. 24, 2015, all of which are hereby incorporated by reference for all purposes as if fully set forth herein.

BACKGROUND

Field

The present invention relates to a wearable device, a wearable device system and a method for controlling the wearable device.

Discussion of the Background

Along with the recent advances in mobile device related technology, smart phones, wearable devices, or the like, become more widespread. The wearable device can be worn on the user's body and may transmit/receive data through communication with smart phones or the like.

Meanwhile, the smart phone is limited in communication when it is used in a public place, and personal privacy of smart phone users may not be protected. In addition, in a case where there are severe background noises, communication quality may be degraded. In order to improve the communication quality, a separate device, such as an ear phone or a headset, is required.

According to embodiments of the present invention, a personal privacy issue can be solved while improving communication voice quality.

In addition, voice quality optimized to users can be provided by determining an amplification extent of a voice signal based on user information.

Further, user convenience can be improved by skipping a main body such that all components are disposed in a band unit and a vibration generating unit coupled to the band unit.

The above and other objects of the present invention will be described in or be apparent from the following description of the preferred embodiments.

The above information disclosed in this Background section is only for enhancement of understanding of the background of the inventive concept, and, therefore, it may contain information that does not form the prior art that is already known in this country to a person of ordinary skill in the art.

SUMMARY

An exemplary embodiment of the present invention disclose a wearable device comprising, a band unit and a vibration generating unit coupled to the band unit, wherein the band unit comprises a communication unit receiving a first signal by a predetermined communication method and a control unit determining an amplification extent of the first signal received from the communication unit and generating a second signal based on the determined amplification extent, and the vibration generating unit receives the second signal from the control unit and generates a vibration corresponding to the second signal.

An exemplary embodiment of the present invention also disclose a wearable device system comprising: a wearable device worn on a user's body and a wireless communication device providing the wearable device with a first signal, wherein the wearable device comprises a band unit determining an amplification extent of the first signal and generating a second signal based on the determined amplification extent and a vibration generating unit coupled to the band unit, receiving the second signal and providing the user's body with a vibration corresponding to the second signal.

An exemplary embodiment of the present invention also disclose a method for controlling a wearable device, the method comprising receiving a first signal from an external device, determining an amplification extent of the first signal and generating a second signal based on the determined amplification extent and generating a vibration corresponding to the second signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIGS. 13A, 13B, 14A, 14B, 15A, 15B, 16, 17, and 18 are diagrams illustrating various embodiments for explaining coupling relationship between a band unit and a vibration generating unit;

FIG. 21 is a diagram illustrating a method for operating the wearable device system shown in FIG. 20; and FIG. 22 is a diagram illustrating an embodiment for determining an amplification extent of a first signal shown in FIG. 21.

DETAILED DESCRIPTION OF THE ILLUSTRATED EMBODIMENTS

Figure 1:
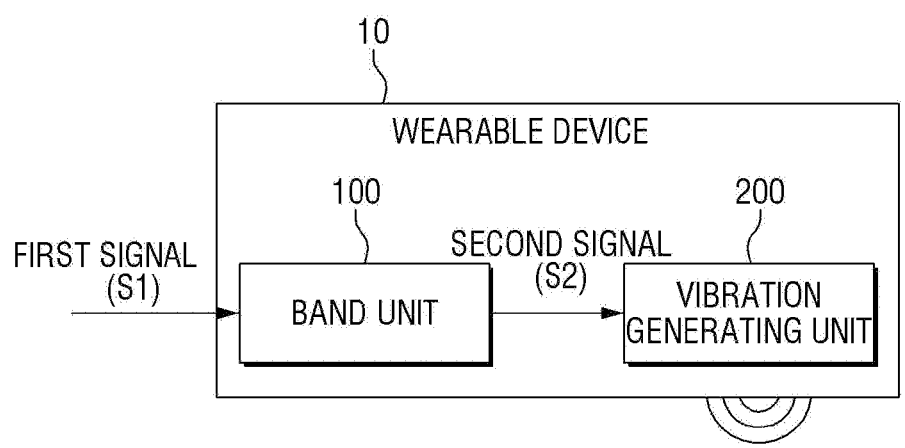
FIG. 1 is a block diagram schematically illustrating a wearable device according to an embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

FIG. 1 is a block diagram schematically illustrating a wearable device according to an embodiment of the present invention.

Referring to FIG. 1, the wearable device 10 according to an embodiment of the present invention may include a band unit 100 and a vibration generating unit 200.

The band unit 100 may receive a first signal S1 by a predetermined communication method and may determine an amplification extent of the first signal S1. The first signal S1 may be a voice signal. The band unit 100 may generate a second signal S2 by amplifying the first signal S1 based on the determined amplification extent. Thereafter, the band unit 100 may provide the vibration generating unit 200 with the generated second signal S2.

The vibration generating unit 200 may receive the second signal S2 from the band unit 100 and may generate a vibration corresponding to the second signal S2.

In more detail, the band unit 100 may receive the first signal S1 from an external device by the predetermined communication method. Here, the external device providing the first signal S1 is not particularly limited so long as it is a device capable of communicating with the wearable device 10 according to an embodiment of the present invention. For example, the external device may be a mobile device, such as a smart phone or a tablet PC, a server or other wearable devices.

The vibration generating unit 200 may generate a vibration corresponding to the second signal S2. Accordingly, the vibration generating unit 200 may provide a portion in direct contact with the vibration generating unit 200, e.g., user's body, with the generated vibration, which will now be described in more detail with reference to FIG. 2.

Figure 2:
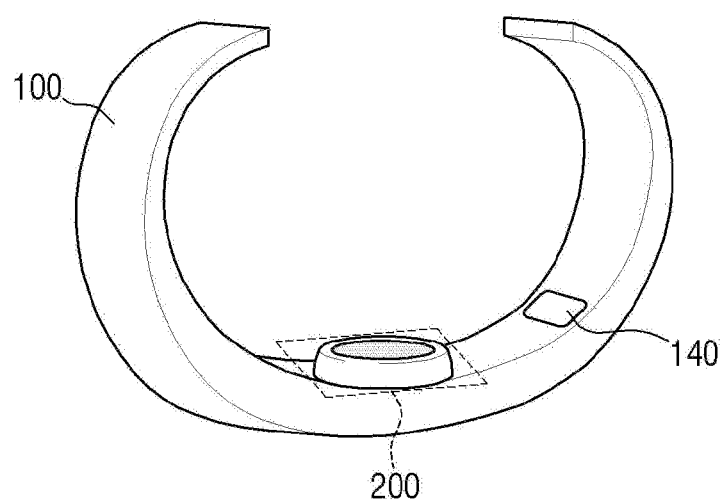
FIG. 2 is a diagram illustrating an external appearance of the wearable device shown in FIG. 1.
Figure 3:
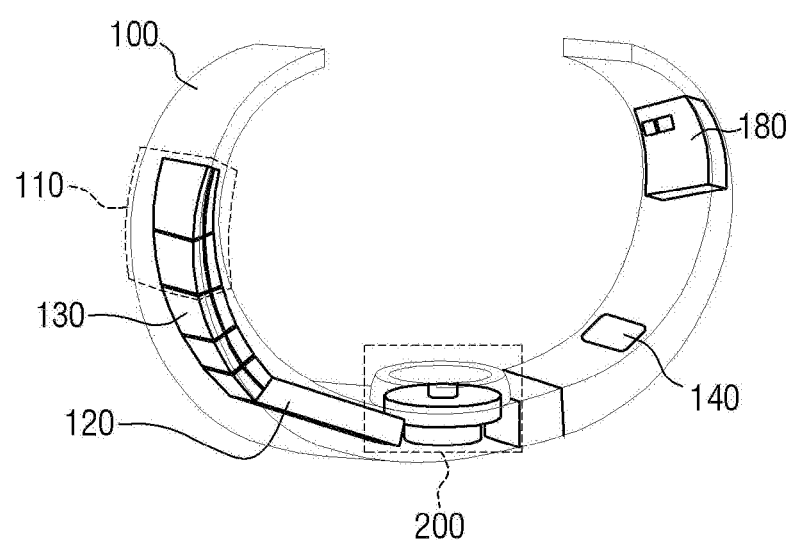
FIG. 3 is a diagram illustrating an internal appearance of the wearable device shown in FIG. 1.

FIG. 2 is a diagram illustrating an external appearance of the wearable device shown in FIG. 1 and FIG. 3 is a diagram illustrating an internal appearance of the wearable device shown in FIG. 1.

Referring to FIGS. 2 and 3, the wearable device 10 according to an embodiment of the present invention may be worn by a user.

The band unit 100 may be curved in a streamlined shape according to the part of the user's body on which the wearable device 10 is worn. For example, the band unit 100 may be the user's wrist. In this case, the band unit 100 may be curved in a streamlined shape according to the user's wrist.

In an exemplary embodiment, the band unit 100 may include a material, such as a metal, textile, leather, rubber, synthetic fiber, wood, ceramic or plastic. In addition, the band unit 100 may include layers of multiple materials stacks to have a multi-layered structure.

The band unit 100 may generally include one surface being in direct contact with the user's body and the other surface facing the one surface. Here, the portion in direct contact with the user's body is a portion to which the vibration generated by the vibration generating unit 200 is applied. Therefore, the vibration generating unit 200 may provide the vibration generating unit is exposed to the one surface of the band unit to then supply the user's body in contact with the one surface of the band unit with the vibration.

Meanwhile, the vibration generating unit 200 may be coupled to the band unit 100. Coupling types of the vibration generating unit 200 with the band unit 100 will later be described with reference to FIGS. 13 to 15.

The band unit 100 may include a control unit 110, a communication unit 120, a power supply unit 130 and an audio I/O unit 140. Referring to FIG. 2, the audio I/O unit 140 may be exposed to the one surface of the band unit 100 to provide a sound to the outside or to receive a sound from the outside. Referring to FIG. 3, the control unit 110, the communication unit 120 and the power supply unit 130 may be positioned within the band unit 100. Therefore, when the band unit 100 is viewed from the outside, the audio I/O unit 140 may be visible, but the control unit 110, the communication unit 120 and the power supply unit 130 may be invisible, but aspects of the present invention are not limited thereto. The audio I/O unit 140 may also be positioned within the band unit 100. In addition, the positional relationship of the components shown in FIGS. 2 and 3 in the band unit 100 is provided only for illustration, but the positions of the respective components are not limited to those shown in FIGS. 2 and 3.

The band unit 100 may include a coupling unit 180 disposed on at least one of one lengthwise side of the band unit 100 and the other side facing the one lengthwise side. The coupling unit 180 may couple the one lengthwise side and to the other side of the band unit 100. Accordingly, the wearable device 10 may be attached to or detached from the user's body. The coupling unit 180 may include a plurality of coupling units. In an exemplary embodiment, the coupling unit 180 may be disposed on the one lengthwise side and the other side of the band unit 100, respectively, to then be coupled to each other.

Figure 4:
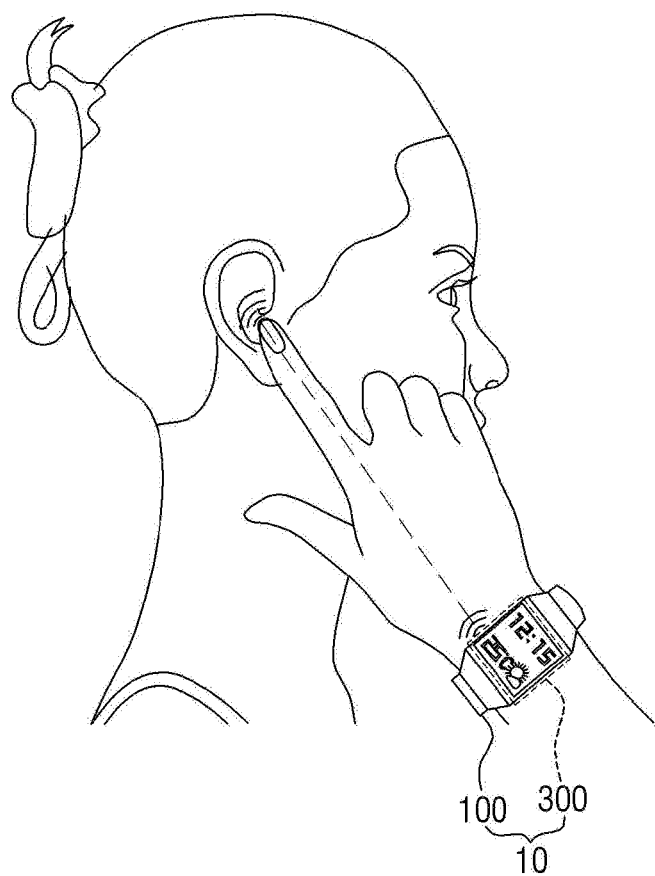
FIG. 4 is a diagram illustrating a state in which a wearable device according to an embodiment of the present invention is worn on user's body.

FIG. 4 is a diagram illustrating a state in which a wearable device (10) according to an embodiment of the present invention is worn on user's body.

Referring to FIG. 4, the wearable device 10 may be worn on the user's body, specifically, on the wrist. In the illustrated embodiment shown in FIG. 4 and the corresponding description of the specification, the wearable device 10 is worn on the user's wrist, but aspects of the present invention are not limited thereto. For example, the wearable device 10 may also be worn on the user's neck, finger, or head.

As shown in FIGS. 1 and 4, the band unit 100 worn on the user's wrist may amplify the first signal S1 received from the external device and may generate the second signal S2. The band unit 100 may provide the vibration generating unit 200 coupled to the band unit 100 with the generated second signal S2. The vibration generating unit 200 may generate a vibration corresponding to the second signal S2 and may provide the user's wrist with the generated vibration. In an exemplary embodiment, the user may lay his/her finger on the ear, specifically on the cartilage, and may hear the sound corresponding to the first signal S1 received from the outside.

Meanwhile, the wearable device 10 according to an embodiment of the present invention may further include a main body 300. In an exemplary embodiment, the main body 300 may include a display unit for displaying a screen. The main body 300 may be connected to or disconnected from the band unit 100. For example, when the band unit 100 is connected to the main body 300, the wearable device 10 according to an embodiment of the present invention may be worn on the user's in the form of a watch. However, when the band unit 100 is not connected to the main body 300, the wearable device 10 according to an embodiment of the present invention may also be worn on the user's in the form of a band. In addition, the type of the main body 300 is not limited to that shown in FIG. 4, so long as it can be connected to or disconnected from the band unit 100.

That is to say, in the wearable device 10 according to an embodiment of the present invention, the control unit 110, the communication unit 120, the power supply unit 130, and the audio I/O unit 140, which will later be described, are provided in the band unit 100. As described above, the main body 300 may be skipped, or the kind of the main body 300 may be changed when necessary.

Figure 5:
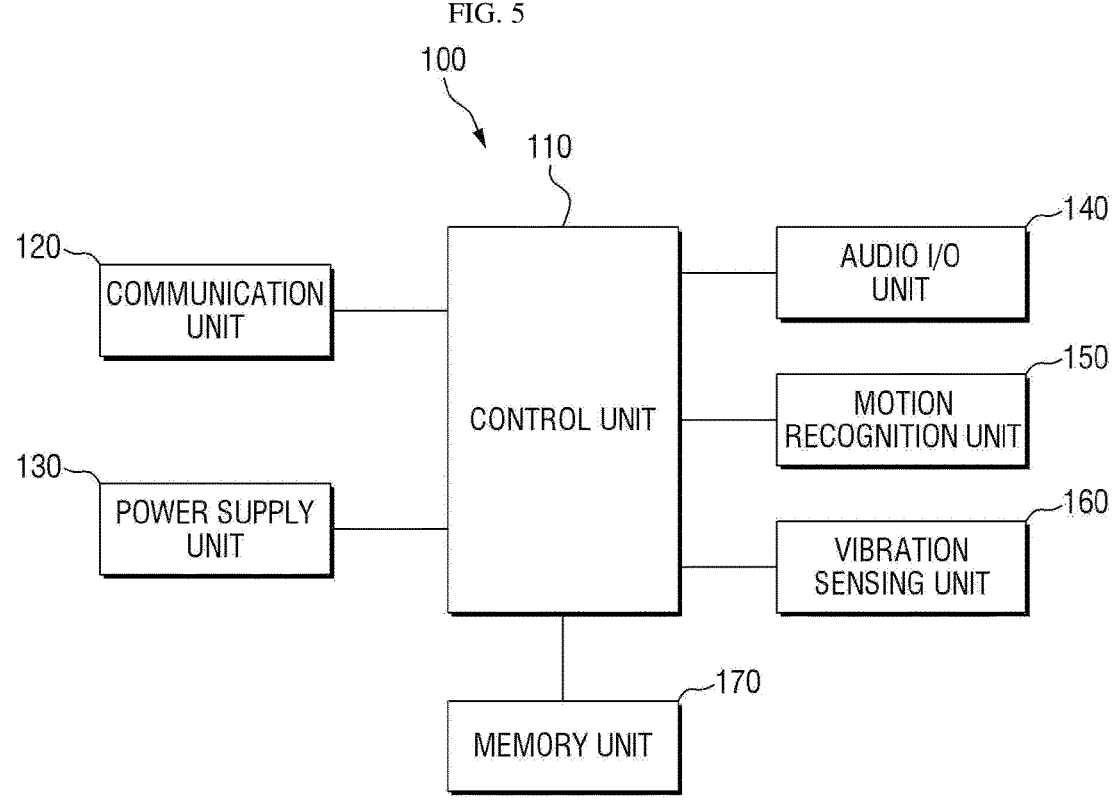
FIG. 5 is a detailed block diagram of a band unit shown in FIG. 1.

FIG. 5 is a detailed block diagram of a band unit shown in FIG. 1.

The band unit 100 may include the control unit 110, the communication unit 120, the power supply unit 130, the audio I/O unit 140, a motion recognition unit 150, a vibration sensing unit 160 and a memory unit 170.

The control unit 110 may receive the first signal S1 from the communication unit 120. The control unit 110 determines the amplification extent of the received first signal S1, amplifies the first signal S1 based on the determined amplification extent and may generate the second signal S2. Thereafter, the control unit 110 may provide the vibration generating unit 200 with the generated second signal S2. The control unit 110 may recognize information on the respective components disposed within the band unit 100 and may perform the overall control on the r respective components based on the recognized information.

The communication unit 120 may receive the first signal S1 from the external device by the predetermined communication method and may provide the control unit 110 with the first signal S1. Here, the external device may be a mobile device, such as a smart phone or a tablet PC, a server or other wearable devices.

Meanwhile, the predetermined communication method may include wi-fi, bluetooth, Zigbee, global positioning System (GPS), cellular communication, including long term evolution (LTE), LTE Advanced (LTE-A), code division multiple access (CDMA), wideband-CDMA (WDCMA), universal mobile telecommunications system (UMTS), wireless Broadband (WiBro), and global system for mobile communications (GSM), and wireless communication, including near field communication (NFC), but aspects of the present invention are not limited thereto.

The band unit 100 may also receive the first signal S1 by a wired communication method, including Universal serial bus (USB), high definition multimedia interface (HDMI), recommended standard 232 (RS-232) or plain old telephone service (POTS). Accordingly, the communication unit 120 may include at least one of a cellular module, a wi-fi module, a bluetooth module, a GPS module, an NFC module, and an radio frequency (RF) module.

The power supply unit 130 may manage power of the wearable device 10 under the control of the control unit 110. In an exemplary embodiment, the power supply unit 130 may include a power management integrated circuit (PMIC), a charger integrated circuit, a battery and a fuel gauge. Although not shown, in an exemplary embodiment, the power supply unit 130 may receive power by a wireless charging method or a wired charging method. In an exemplary embodiment, the wireless charging method may be one of a magnetic resonance method, a magnetically inductive method and a electromagnetic wave method, and an additional circuit, for example, a coil loop, a rectifier, or a resonance circuit, may be added. In addition, the battery may store or generate electricity and may supply the wearable device 10 with the power. Here, the battery may be a rechargeable battery or a solar battery.

The audio I/O unit 140 may convert the sound received from the external device into an electric signal. Alternatively, the audio I/O unit 140 may convert an electric signal into a sound to then be supplied to the outside. That is to say, the audio I/O unit 140 may convert the sound and the electric signal in bidirectional ways. In an exemplary embodiment, the audio I/O unit 140 may include a microphone for receiving the sound from the outside, and a speaker for supplying the sound to the outside. In addition, in the specification of the present invention, the audio I/O unit 140 as a single module is illustrated, but aspects of the present invention are not limited thereto. The microphone for receiving the sound from the outside, and the speaker for supplying the sound to the outside, may be independently disposed in the band unit 100.

The motion recognition unit 150 may sense an operating state, a physical quantity, an acceleration or an angular speed of the wearable device 10 and may provide the control unit 110 with the sensed information. In an exemplary embodiment, the motion recognition unit 150 may include a gesture sensor, a gyro sensor, an acceleration sensor, an angular sensor, and a proximity sensor.

The vibration sensing unit 160 may sense a physical vibration applied to the vibration sensing unit 160 and may convert the sensed vibration into an electric signal. The vibration sensing unit 160 may provide the control unit 110 with the converted electric signal. In an exemplary embodiment, the vibration sensing unit 160 may include a piezoelectric sensor. In addition, the vibration sensing unit 160 may be integrated with the motion recognition unit 150 to be formed as a single module.

The memory unit 170 may store data received from the control unit 110 or other components or data generated from the control unit 110 or other components. In an exemplary embodiment, the memory unit 170 may store at least one of user information and background information. The user information may include at least one of user's age, sex, height, weight, finger length and wrist-to-finger length. The background information may include a background noise intensity.

In an exemplary embodiment, the memory unit 170 may be an internal memory. In more detail, the memory unit 170 may include at least one of a volatile memory, such as a dynamic random access memory (DRAM), a static RAM (SRAM), or a synchronous dynamic RAM (SDRAM), and a non-volatile memory, such as an one time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory. In addition, the memory unit 170 may be a solid state drive (SSD).

Meanwhile, in an exemplary embodiment, the memory unit 170 may be an external memory. In more detail, the memory unit 170 may further include a flash drive (e.g., a compact flash (CF) drive, secure digital (SD), micro secure digital (micro-SD), mini secure digital (mini-SD), extreme digital (xD), a memory stick, and/or the like. In this case, the memory unit 170 may be connected to the wearable device 10 via various interfaces.

Figure 6:
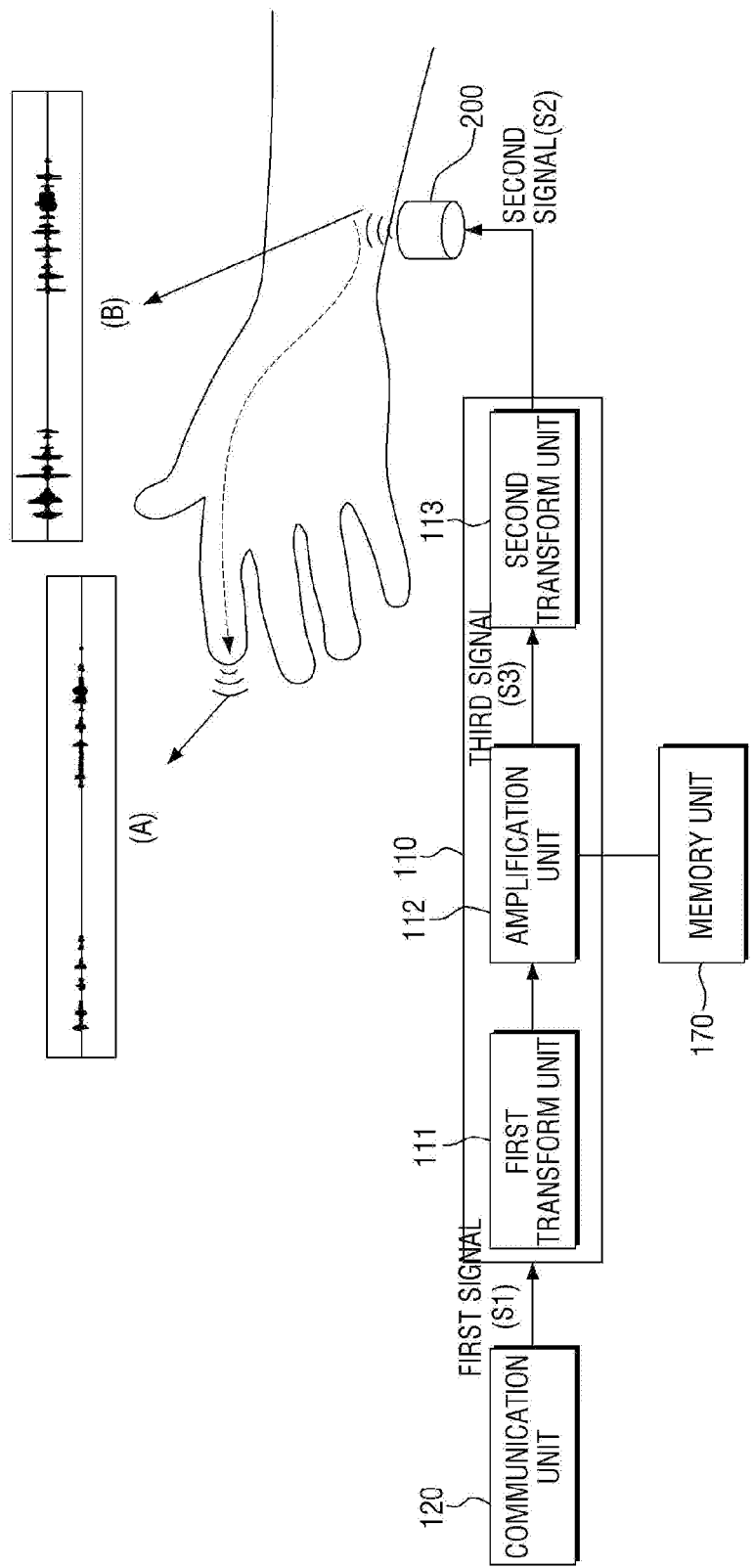
FIG. 6 is a diagram illustrating a method for controlling a wearable device according to an embodiment of the present invention.
Figure 7:
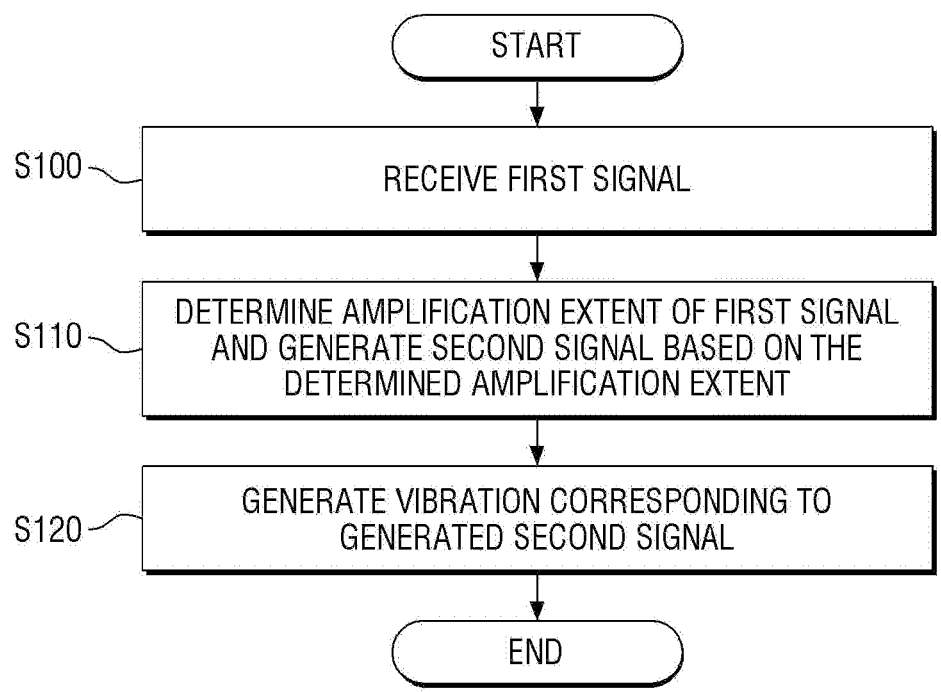
FIG. 7 is a flowchart illustrating the method for controlling a wearable device shown in FIG. 6.

FIG. 6 is a diagram illustrating a method for controlling a wearable device according to an embodiment of the present invention and FIG. 7 is a flowchart illustrating the method for controlling a wearable device shown in FIG. 6.

The method for controlling the wearable device 10 according to an embodiment of the present invention will now be described with reference to FIGS. 6 and 7. Meanwhile, in an exemplary embodiment, the wearable device 10 worn on the user's wrist and connected to a smart phone as an external device through wireless communication will be described by way of example.

First, the wearable device 10 may receive a first signal S1 from an external smart phone through a communication unit 120 by a predetermined communication method (S100). The control unit 110 may determine an amplification extent of the first signal S1 received from the communication unit 120 and may generate a second signal S2 based on the determined amplification extent (S200). Next, the control unit 110 may provide the vibration generating unit 200 with the generated second signal S2 and the vibration generating unit 200 may generate a vibration corresponding to the received second signal S2 (S300). Accordingly, the vibration generated by the vibration generating unit 200 may be transferred to the user's wrist. Accordingly, the user may lay his/her finger on the ear, specifically on the cartilage, and may hear the sound transferred through the vibration.

Referring to FIG. 6, an intensity (a) of the vibration corresponding to the second signal S2 is stronger than an intensity (b) of the vibration transferred to a user's finger tip through the user's wrist, which suggests that the intensity of the vibration is attenuated while the vibration is transferred to the user's finger tip. The intensity of the vibration may be attenuated due to several causes, such as user's body characteristics, background noises, or the like.

Accordingly, the wearable device 10 according to an embodiment of the present invention may determine the amplification extent of the first signal S1 based on the user information on the basis that the intensity of the vibration may be attenuated, may amplify the first signal S1 based on the determined amplification extent and may generate a second signal S2. That is to say, the vibration generating unit 200 may apply the vibration corresponding to the amplified second signal S2 to the user's wrist from the beginning, thereby allowing the user to well hear the sound transferred through the vibration even if the vibration is attenuated.

To this end, the control unit 110 may include a first transform unit 111 performing discrete fourier transform (DFT) on the first signal S1, an amplification unit 112 amplifying a signal for the value obtained as the result of performing the DFT, and a second transform unit 113 performing inverse discrete fourier transform (IDFT) on the amplified signal. In particular, the amplification unit 112 may obtain a gain value corresponding to the amplification extent of the first signal S1 based on the user information and may amplify the first signal S1 by interleaving the gain value into the DFT performed first signal.

Meanwhile, the user information may be pre-stored in the memory unit 170. Alternatively, the user information may be directly input by the user.

Figure 8:
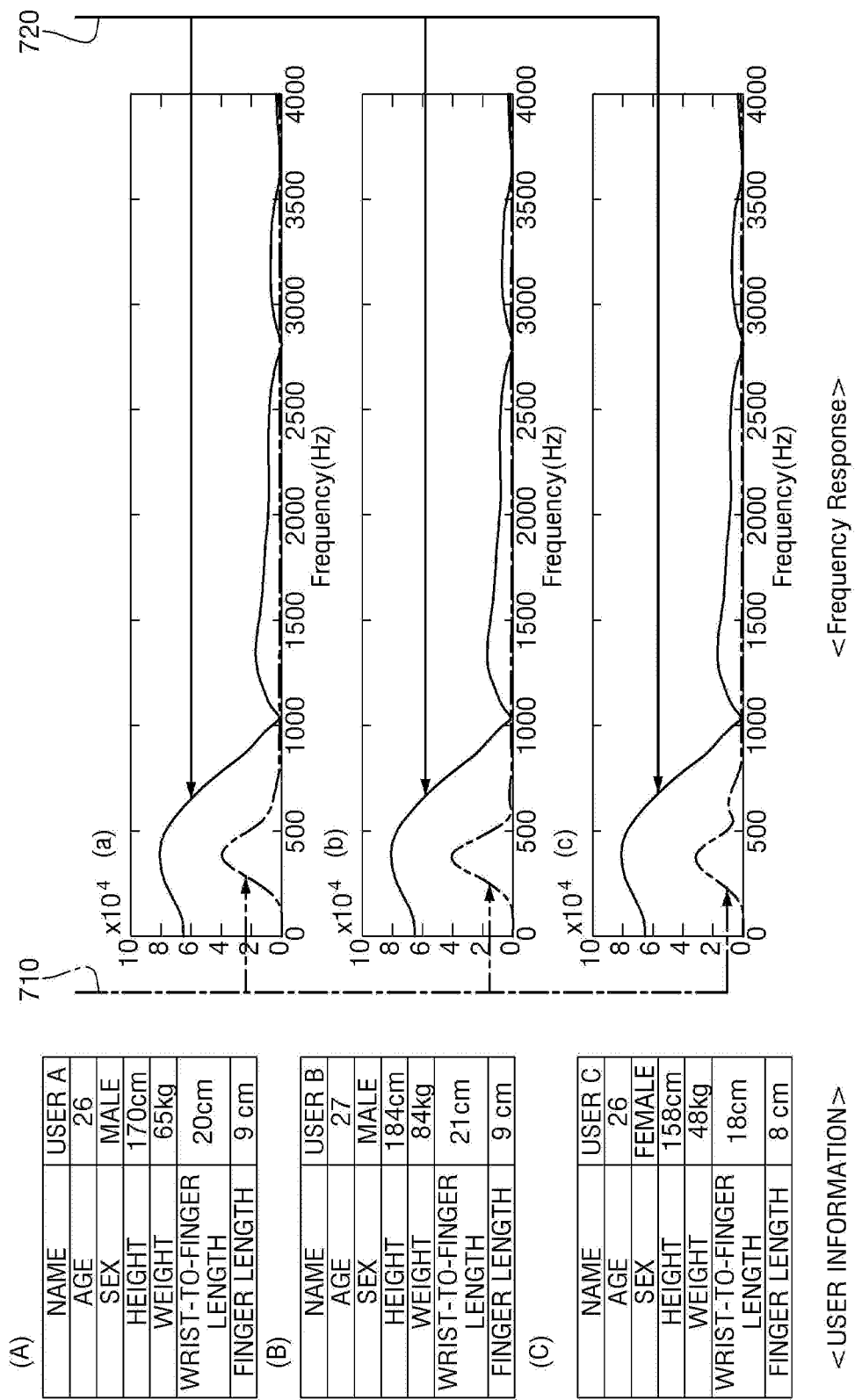
FIG. 8 is a diagram illustrating an embodiment for determining an amplification extent of a first signal.
Figure 9:
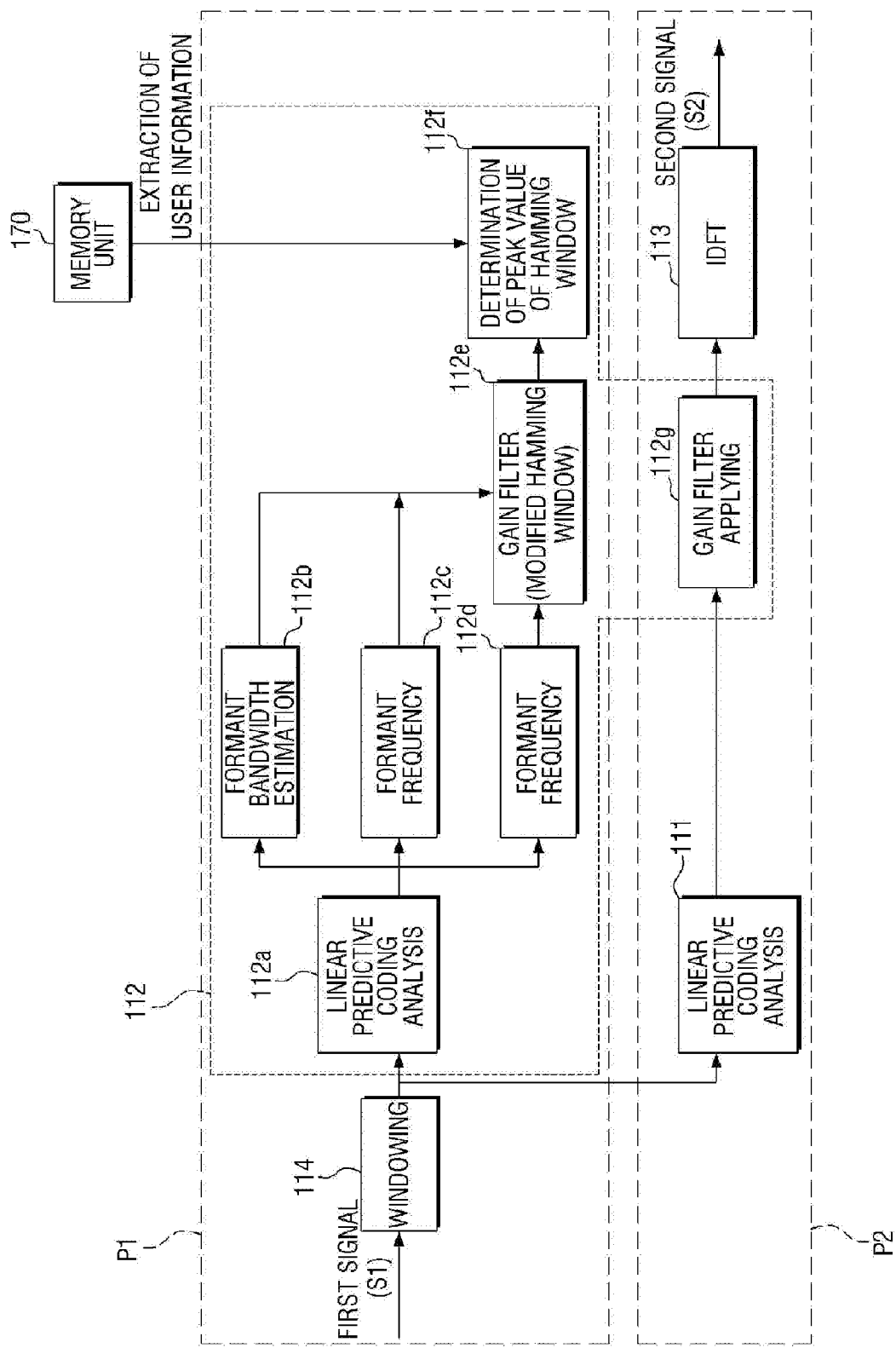
FIG. 9 is a diagram illustrating an amplification method according to the embodiment for determining an amplification extent shown in FIG. 8.
Figure 10:
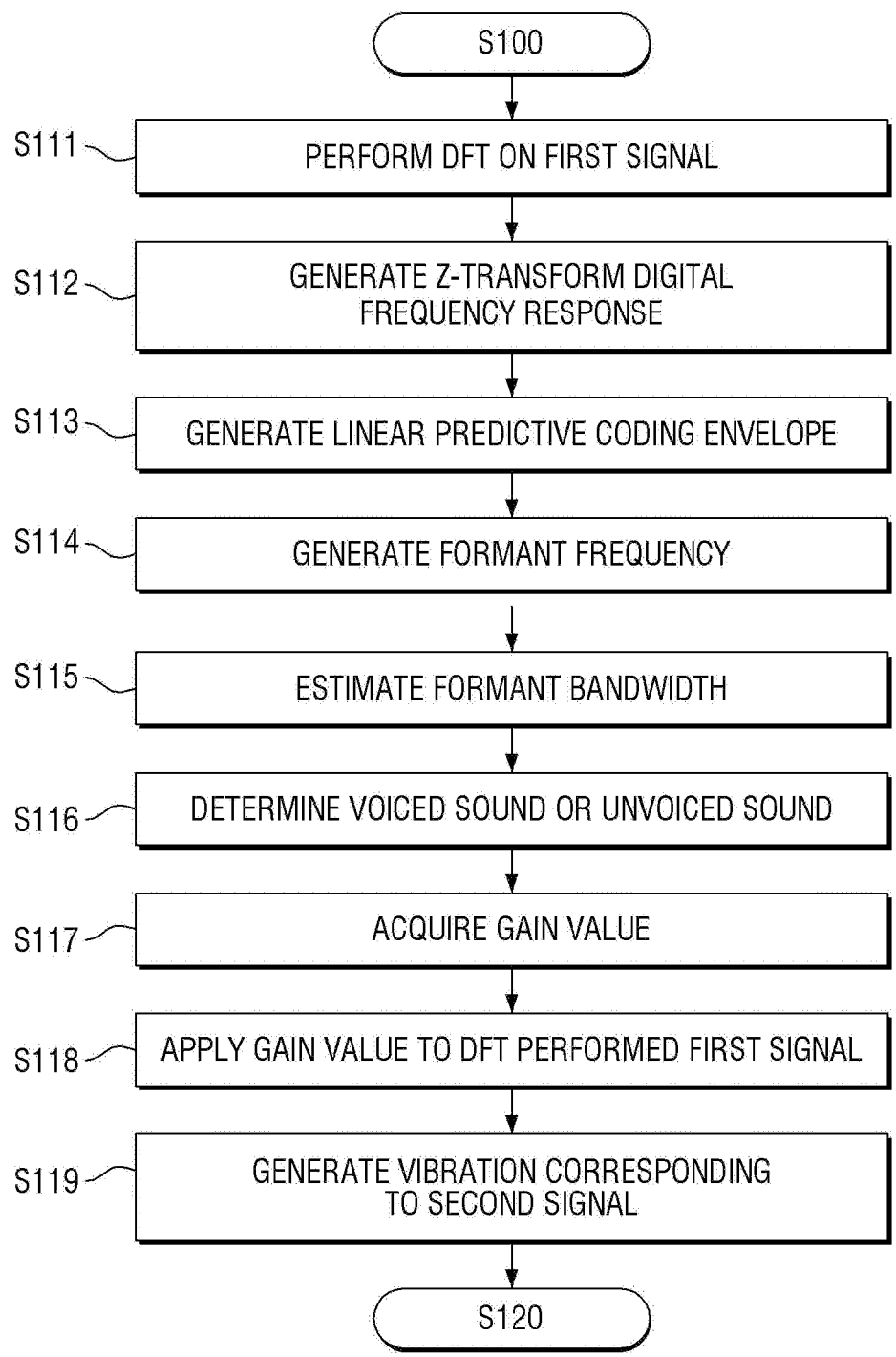
FIG. 10 is a flowchart illustrating the amplification method according to the embodiment for determining an amplification extent shown in FIG. 8.

An embodiment for determining the amplification extent of the first signal S1 and an amplification method according to the embodiment for determining the amplification extent of the first signal S1 will now be described in more detail with reference to FIGS. 8 to 10. In FIGS. 8 to 10, the determining of the amplification extent and the amplification method will be described with regard to a case where a plurality of pieces of user information are input to the memory unit 170 in advance.

FIG. 8 is a diagram illustrating an embodiment for determining an amplification extent of a first signal, FIG. 9 is a diagram illustrating an amplification method according to the embodiment for determining an amplification extent shown in FIG. 8, and FIG. 10 is a flowchart illustrating the amplification method according to the embodiment for determining an amplification extent shown in FIG. 8.

Referring to FIGS. 8 to 10, the generating of the second signal S2 is largely divided into enhancing formants (P1) and adopting a filter (P2). The enhancing of the formants (P1) and the adopting of the filter (P2) may be simultaneously performed or may be sequentially performed for windowing purposes (114).

The first transform unit 111 may perform DFT on the first signal S1 (S111). At the same time (or sequentially), the amplification unit 112 may acquire a linear predictive coding coefficient (LPCC) through linear predictive coding (LPC) analysis 112a of the first signal S1.

The amplification unit 112 computes Z-transform digital frequency responses using the acquired LPCC (S112). Thereafter, the amplification unit 112 computes absolute values of complex numbers for the respective frequency indices of the Z-transform digital frequency responses and obtains logarithmic values of the absolute values to acquire a linear predictive coding envelope S113).

In more detail, when the first signal S1 received from communication unit 120 is defined as y (t), LPCC's are defined as α(p+1), and p denotes a degree of the LPCC's, results of applying Short-Time Fourier Transform (STFT) to the signal and coefficients may be represented by Y (i, k) and A (i, k). Here, i denotes a frame index, and k denotes a frequency index. The control unit 270 may calculate a Z-transform digital frequency response H(z) using the LPCC's by the following formula (1):

$$H(z) = \frac{G}{A(z)} = \frac{G}{1 - \sum_{l=1}^{p} a_l z^{-l}}$$

Next, in order for the amplification unit 112 to obtain a linear predictive coding envelope using the frequency response H(z) calculated using the formula (1), the respective frequency indices $F_k$ are defined by the following formula (2):

$$F_k = \ln(|H(z)|) \qquad (2)$$

The amplification unit 112 may acquire the linear predictive coding envelope using the frequency index $F_k$ defined in the formula (2).

Additionally, the amplification unit 112 may estimate a formant bandwidth (112b) and a formant frequency (112c) (S114 and S115). In more detail, the amplification unit 112 may estimate the formant frequency using a change in the slope of the linear predictive coding envelope (112c). The amplification unit 112 may calculate a frequency in which the slope of the linear predictive coding envelop is changed from positive to negative using the formula (3) to estimate the calculated frequency as a formant frequency (FF):

$$FF = k, \frac{dF(k)}{dk} = 0 \text{ and } \frac{dF(k+1)}{dk} < 0$$

In addition, the amplification unit 112 may estimate a bandwidth of at least one formant frequency based on the CPCC's (112b). Here, the estimating of the formant bandwidth and the estimating of the at least one formant frequency may be performed regardless of the order and may be simultaneously or sequentially performed.

In an exemplary embodiment, the amplification unit 112 may express the LPCC in the form of a 10th degree polynomial, may calculate a complex number root and a real root using a Bairstow technique, and may estimate bandwidths of the respective formant frequencies. In more detail, the LPCC P(z) can be written in the 10th degree polynomial by the formula (4):

$$P(z) = z^m + a_{m-1} z^{m-1} + 0 + a_1 z + a_0(z^m)$$

Then, the real root or the complex number root of the 10th degree polynomial for the Z-transform digital frequency response H(z) and the LPCC P(z) are calculated. In order to obtain the real root or the complex number root, the Bairstow technique may be used, as represented by the formula (5):

$$H(z) = \frac{G}{\prod_{i=1}^{P}(1 - p_i z^{-l})}, \; p_k = r_k e^{jw_k}$$

The amplification unit 112 may obtain the bandwidth Bk corresponding to each of the formant frequency (Fs) using the formula (5), as represented by the formula (6):

$$B_k = -\frac{F_s}{\pi} \ln(r_k)$$

Then, based on the linear predictive coding envelope, the amplification unit 112 may determine whether the first signal S1 is a voiced sound or an unvoiced sound (112d, S116). In more detail, the amplification unit 112 determines whether the first signal S1 is a voiced sound or an unvoiced sound according to the condition of the formula (7).

That is to say, if the condition of the formula (7) is satisfied, the amplification unit 112 determines that the first signal S1 is a voiced sound.

$$Voicedsignal, Amax < 2N_{AV} \text{ or } L_{max} < N_{pt}/4 \text{ or } LA_{max} < N_{AV}/2$$

$$A_{max} = \text{MAX}(H(L_{max}))$$

$$A_{MX} = \text{MAX}(S_{R1}, S_{R2}, S_{R3}, S_{R5})$$

$$S_{R1} = \sum_{k=0}^{(Npt/8)-1} H(k), S_{R2} = \sum_{k=Npt/8}^{(Npt/4)-1} H(k)$$

$$S_{R3} = \sum_{k=Npt/4}^{(3Npt/8)-1} H(k), S_{R4} = \sum_{k=3Npt/8}^{(Npt/2)-1} H(k)$$

where NAV is an average of formant values of a pertinent frame and Npt is a magnitude of the frame when DFT is performed.

The amplification unit 112 may constitute a formant enhancement filter 112e based on the formant frequency, the formant bandwidth, the characteristics of the determined voiced sound or unvoiced sound and the user information. That is to say, when the vibration generated by the vibration generating unit 200 passes the user's body, the amplification unit 112 may in advance enhance a portion of the formant frequency just in case where a loss is generated in the portion of the formant frequency.

In more detail, the amplification unit 112 calculates the modified Hamming window for the formant bandwidth in consideration of the characteristics of the voiced sound or unvoiced sound using the formula (8), and determines a peak value of the modified Hamming window in consideration of the user information (112f):

$$G(n, k) = \frac{h(n) - \min(h)}{1 - \min(h)} + 1^{a(i,k)}$$

$$a(i, k) = \frac{\log(|FR(i, k)|)}{\log(|Y(i, k)|)}$$

$$h(n) = 0.54 - 0.46\cos\left(2\pi\frac{n}{N}\right)$$

where a is a peak value of the Hamming window modified in consideration of characteristics of the voiced sound or unvoiced sound and the user information, h(n) is a Hamming window, and FR (i, k) is a frequency response of the user's body based on the user information.

As described above, the user information may be pre-stored in the memory unit 170. In this case, various user characteristics are classified and a plurality of user information groups may be generated according to the classified user characteristics. The plurality of user information groups may be pre-stored in the memory unit 170 and the user may select one of the pre-stored user information groups. In such a manner, the selected user information group may be reflected on computation for obtaining a gain value, which will later be described. Meanwhile, when the user does not select any of the user information groups or when the wearable device 10 according to an embodiment of the present invention operates for the first time, the amplification extent of the first signal S1 may be determined using one of the plurality of user information groups, which is set as a default.

Referring to FIG. 8, when the vibration is applied to users A to C, all of the users A to C show different vibration intensities 710 and different frequency responses 720, suggesting that vibrations are attenuated differently according to user characteristics included in the user information.

Therefore, the user may select one of a plurality of pieces of user information pre-stored in the memory unit 170. Accordingly, the amplification unit 112 may extract the one selected by the user among the plurality of pieces of user information pre-stored in the memory unit 170 and may constitute the formant enhancement filter 112e based on the selected user information. That is to say, the formant enhancement filter 112e means a gain filter for amplifying a to-be-amplified portion of the DFT-performed first signal S1 based on the user information (S117).

The amplification unit 112 may generate a third signal S3 by applying the formant enhancement filter 230 to the DFT performed first signal S1 using the formula (9) (112g, S118). The second transform unit 113 may generate the second signal S2 by performing (IDFT) on the third signal S3 and may provide the vibration generating unit 200 with the generated second signal S2 (S119).

$$Y_{enh}(i,k) = GY(i,k)$$

Accordingly, since the control unit 110 amplifies the first signal S1 based on the user information in advance before a vibration is generated, it is possible to overcome attenuation of voice quality or clarity, which may be caused when the vibration generated by the vibration generating unit 200 is attenuated or distorted by medium characteristics of the user's body while passing the user's body. In more detail, in order to minimize a difference between the formant of the first signal S1 and the formant of the second signal S2, the gain value with the medium characteristics of the user's body taken into consideration is applied to the first signal S1, thereby improving the clarity of the first signal S1. In addition, since the gain value is appropriately applied to the first signal S1 according to the user information, the quality of the first signal S1 can be more accurately improved.

Figure 11:
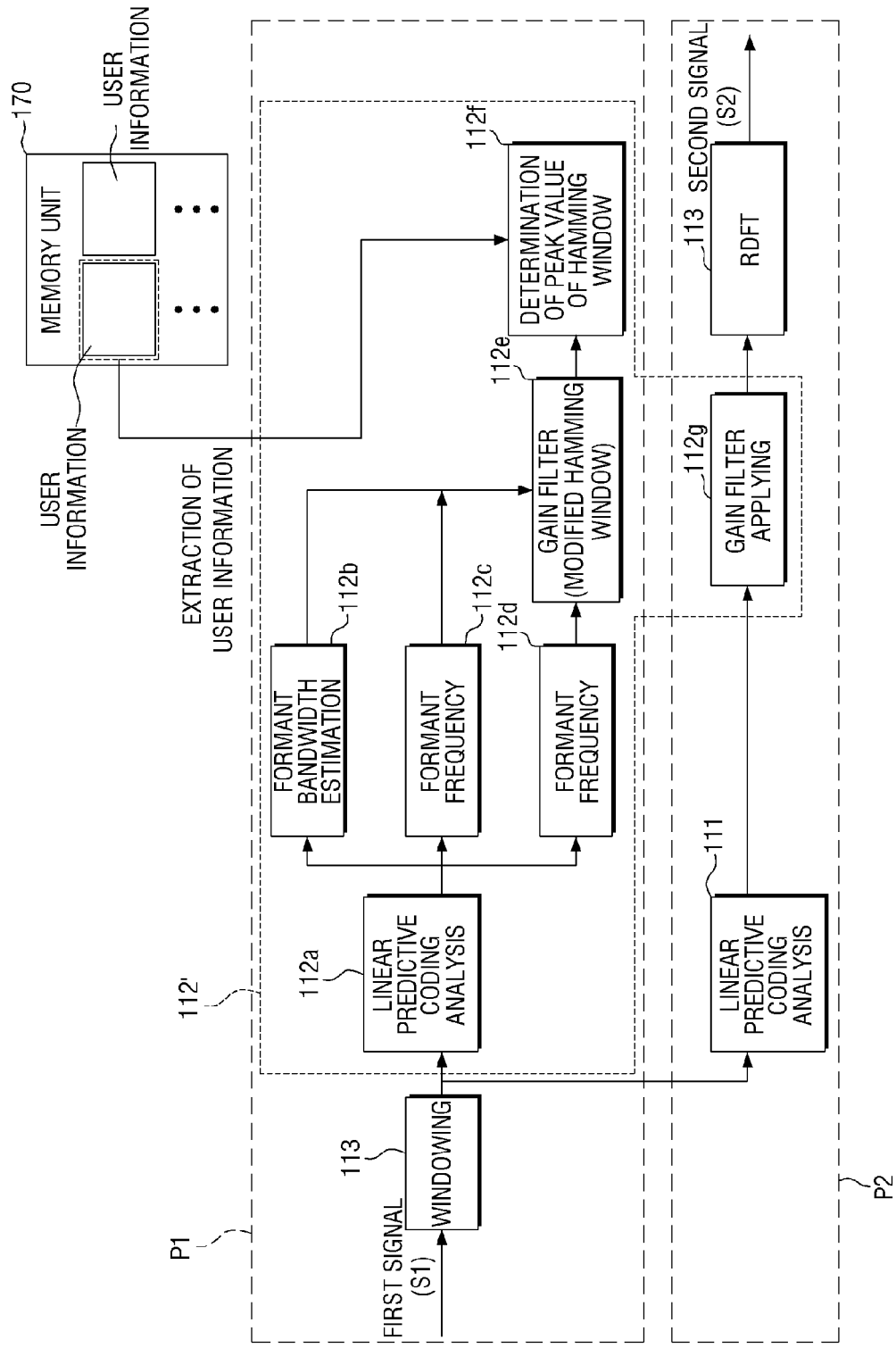
FIG. 11 is a diagram illustrating another embodiment for determining an amplification extent of a first signal.

FIG. 11 is a diagram illustrating another embodiment for determining an amplification extent of a first signal. In the following description, compared to the embodiment shown in FIGS. 8 to 10, the repeated content will not be given.

Referring to FIG. 11, in the present embodiment for determining the amplification extent of the first signal, user information may be directly input by the user. The user information may be input by communication with an external device or may be directly input by the user. In the latter case, the band unit 100 may further include an input unit for inputting the user information. The control unit 110 may compare the input user information with a plurality of pieces of pre-stored user information. In such a manner, the control unit 110 may extract from the memory unit 170 the user information among the plurality of pieces of pre-stored user information, which is most similar to the user information directly input by the user. Accordingly, since the user is allowed to directly select the user information that is most similar to the directly input user information from the control unit 110, user convenience can be improved.

Figure 12:
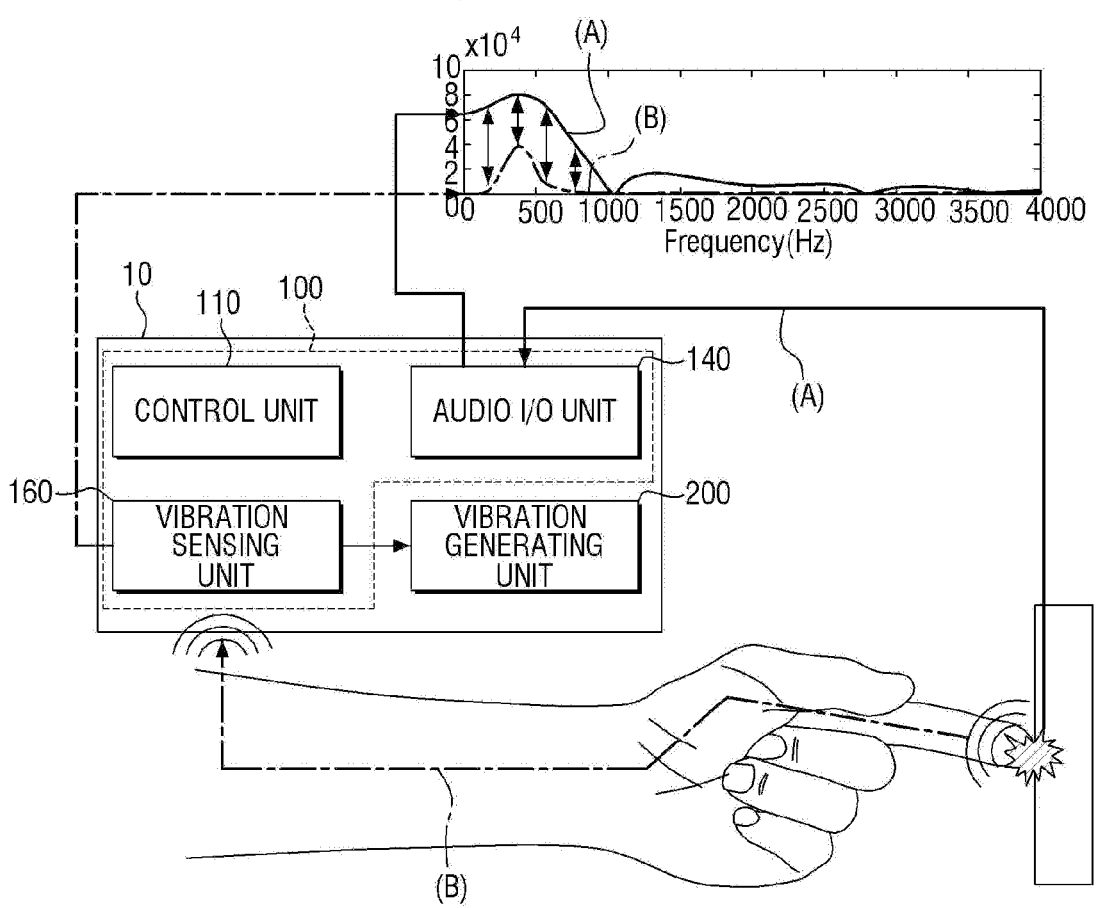
FIG. 12 is a diagram illustrating still another embodiment for determining an amplification extent of a first signal.

FIG. 12 is a diagram illustrating still another embodiment for determining an amplification extent of a first signal. In the following description, compared to the embodiment shown in FIGS. 8 to 10, the repeated content will not be given.

Referring to FIG. 12, in the present embodiment for determining the amplification extent of the first signal, user information may be directly measured by the user. In more detail, when the user intends to directly measure the user information, the wearable device 10 according to an embodiment of the present invention is worn on the user's wrist and a user's finger is brought into contact with an external object, thereby generating a vibration and a sound corresponding to the vibration.

The audio I/O unit 140 may receive the sound corresponding to the vibration generated by the user and may provide the control unit 110 with the received sound (a). In addition, vibration sensing unit 160 may sense the vibration transferred to the vibration sensing unit 160 through the user's body and may provide the control unit 110 with the sensed vibration (b).

The control unit 110 may calculate a frequency response for the user based on the signal received from the audio I/O unit 140 and the signal received from the vibration sensing unit 160. In such a manner, the control unit 110 may generate user information and may provide the memory unit 170 with the generated user information.

The control unit 110 may determine the amplification extent of the first signal S1 using the user information stored in the memory unit 170 and may generate the second signal S2.

Meanwhile, the wearable device 10 according to an embodiment of the present invention may perform a user authentication procedure through the above-described process. That is to say, the wearable device 10 may compare the user information pre-stored in the memory unit 170 with the user information measured by the user who is currently putting on the wearable device 10 to confirm whether the pre-stored user information is identical with the measured user information, thereby performing the user authentication procedure.

Next, coupling relationship between the band unit 100 and the vibration generating unit 200 will be described in detail with reference to FIGS. 13 to 18. However, shapes of the band unit 100, the vibration generating unit 200 and coupling members 300a-300g are not limited to those shown in FIGS. 13 to 18. Rather, the band unit 100, the vibration generating unit 200 and coupling members 300a-300g may have various structures, shapes and sectional structures.

FIGS. 13 to 18 are diagrams illustrating various embodiments for explaining coupling relationship between a band unit (100) and a vibration generating unit (200).

The band unit 100 may be coupled to the vibration generating unit 200 by the coupling members 300a to 300g. That is to say, the band unit 100 may be spaced apart from the vibration generating unit 200. In an exemplary embodiment, the band unit 100 may not be brought into direct contact with the vibration generating unit 200. With such coupling structures, it is possible to prevent the vibration generated by the vibration generating unit 200 from being transferred to the band unit 100, causing inconvenience to the user, or to prevent the vibration applied to the user's body from being affected by the band unit 100. In addition, in an exemplary embodiment, the band unit 100 may be detachably coupled to the vibration generating unit 200. Accordingly, when a defect is caused to one of the vibration generating unit 200 and the band unit 100, only the defective one may be replaced.

Figure 13A:
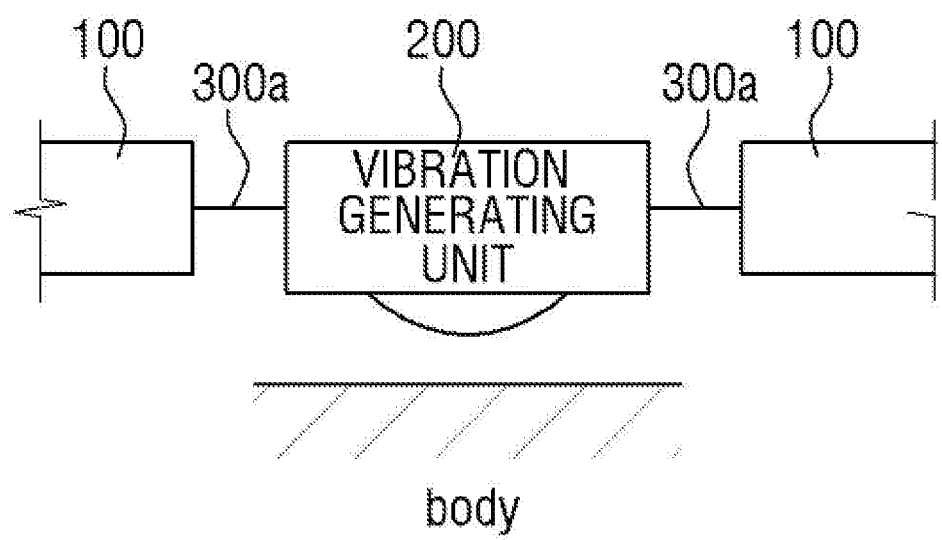
Figure 13B:
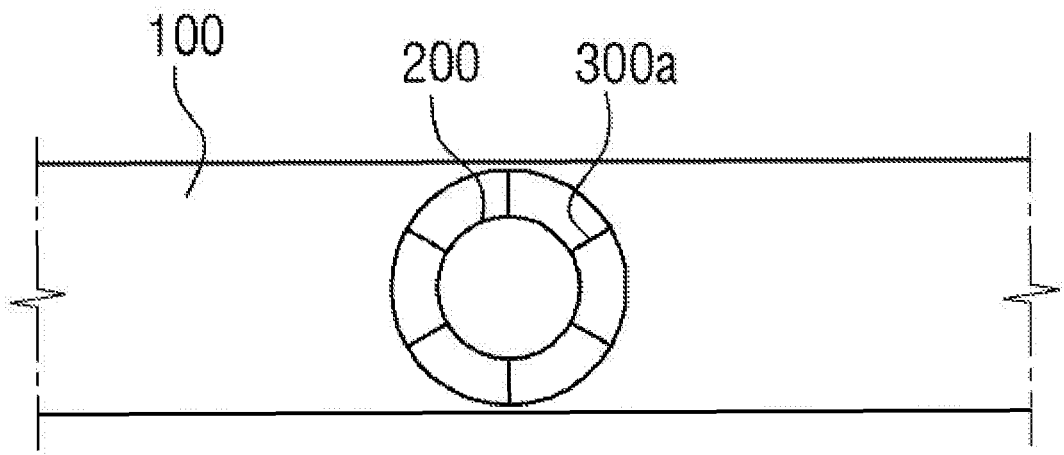

First, referring to FIG. 13A and FIG. 13B, the band unit 100 may be coupled to the vibration generating unit 200 by a plurality of coupling members 300a. The plurality of coupling members 300a in forms of bridges may fixedly couple the vibration generating unit 200 to the band unit 100. The plurality of coupling members 300a may have resilience to prevent the vibration generated by the vibration generating unit 200 from being transferred to the band unit 100. In addition, the number, shapes and arrangements of the plurality of coupling members 300a are not limited to those shown in FIG. 13A and FIG. 13B.

Figure 14A:
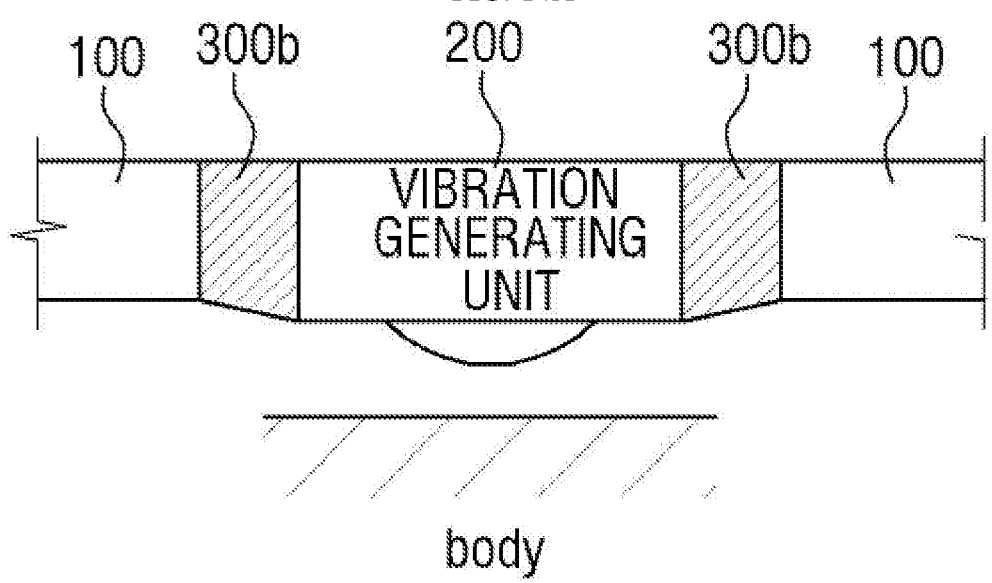
Figure 14B:
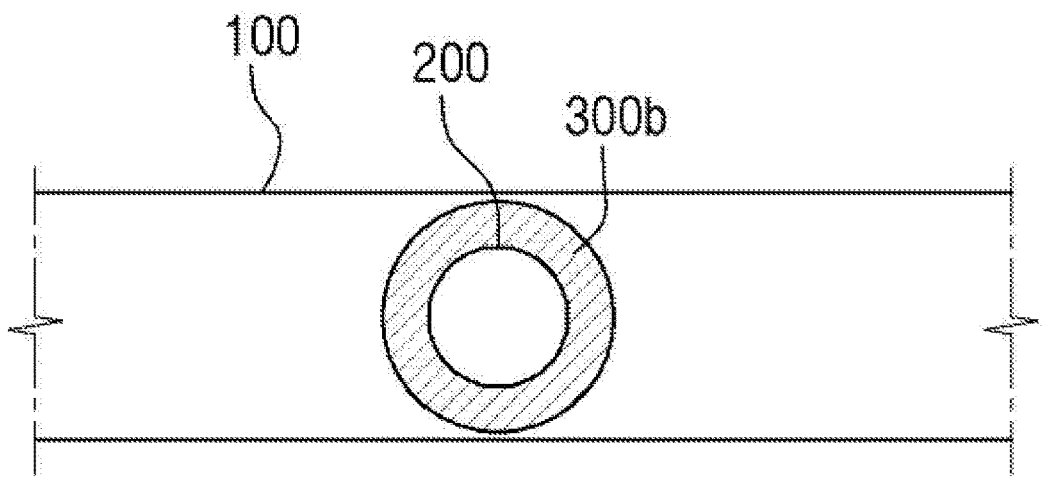

Referring to FIG. 14A and FIG. 14B, the coupling member 300b may be disposed between the band unit 100 and the vibration generating unit 200. In order to prevent the vibration generated by the vibration generating unit 200 from being transferred to the band unit 100, the coupling member 300b may be formed as a shock absorbing member or a damper. The coupling member 300b may be configured to correspond to shapes of the vibration generating unit 200 and the band unit 100. The structure of the coupling member 300b is not limited to the circular shape, as shown in FIG. 14A and FIG. 14B.

Figure 15A:
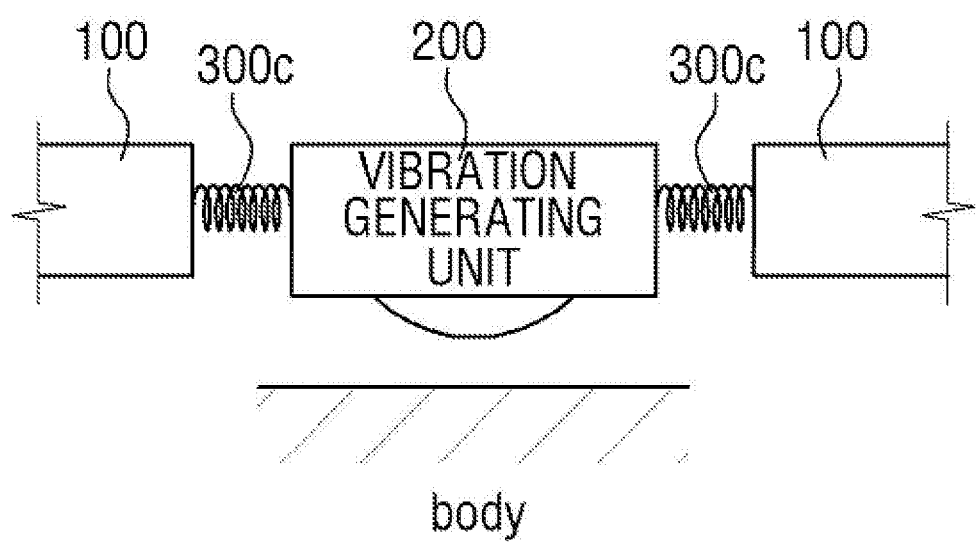

Referring to FIG. 15A, the coupling member 300c may be a spring having resilience. Accordingly, it is possible to prevent the vibration generated by the vibration generating unit 200 from being transferred to the band unit 100. Referring to FIG. 15B, the coupling member 300d may be bent and may suppress the vibration generated by the vibration generating unit 200 from being transferred to the band unit 100 through bent portions.

Figure 16:
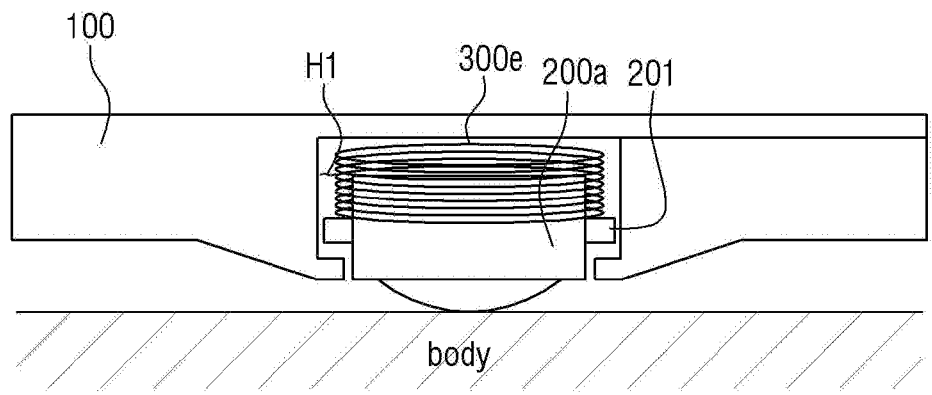

Referring to FIG. 16, the band unit 100 may include a groove portion H1. A vibration generating unit 200a and a coupling member 300e may be disposed in the groove portion H1. In more detail, the coupling member 300e may be disposed between the vibration generating unit 200a and a bottom surface of the groove portion H1. In an exemplary embodiment, the coupling member 300e may be a spring having resilience and may be configured to surround a body of the vibration generating unit 200a. The vibration generating unit 200a may include a wing portion 201 extending from the body. Accordingly, it is possible to prevent the vibration generating unit 200a from being separated from the band unit 100.

Figure 17:
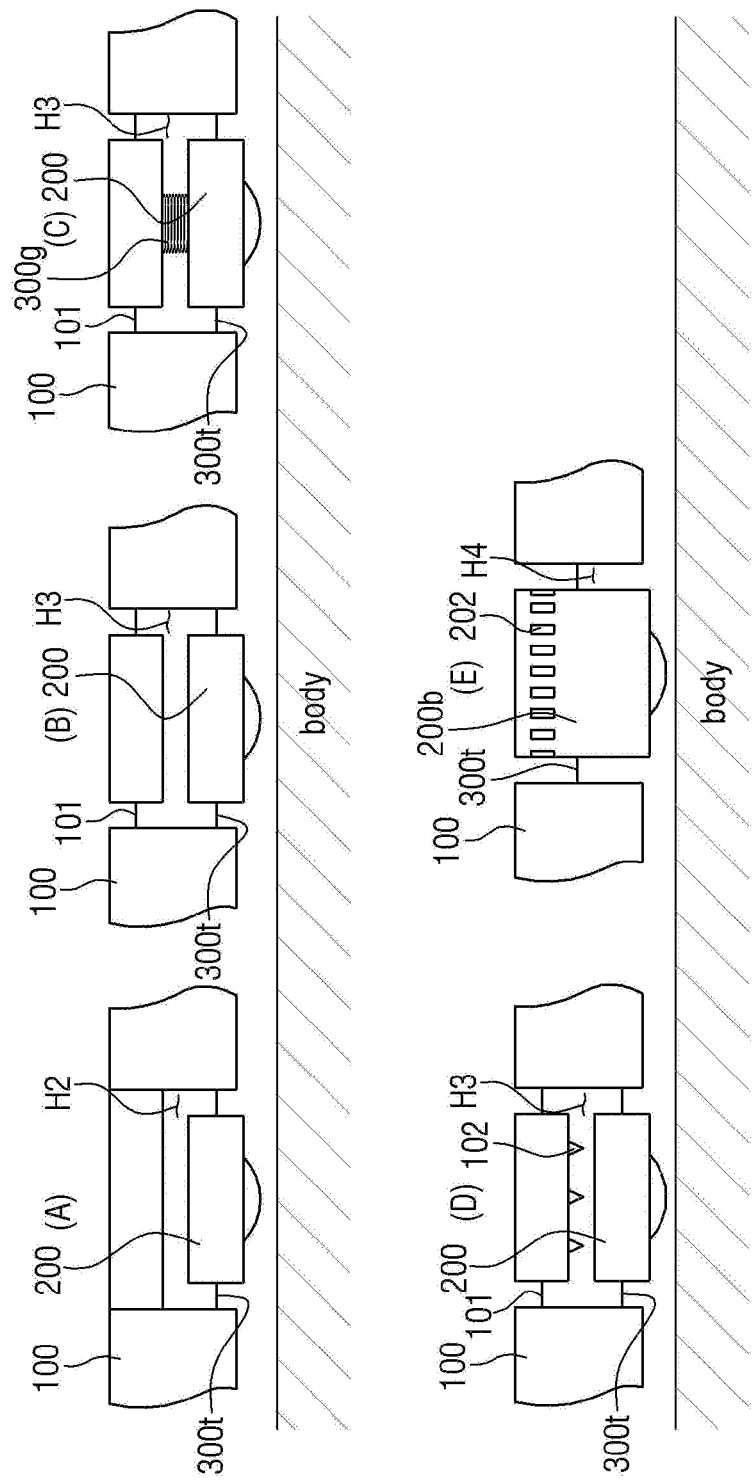

Referring to FIG. 17, the band unit 100 may further includes holes formed in one surface on which the vibration generating unit 200 comes into contact with the user's body and the other surface facing the one surface. The band unit 100 allows the internal air to enter or leave the same when the vibration generating unit 200 generates a vibration, thereby suppressing the vibration from being transferred to the band unit 100. Meanwhile, the wearable device 10 according to an embodiment of the present invention may be so configured as shown in FIGS. 17A to 17E, to allow only the air to enter or leave while preventing foreign materials, such as water or dust, from being introduced through the holes.

In more detail, referring to FIG. 17 (a), the band unit 100 may include a groove portion H2 having greater width and length than the vibration generating unit 200. The vibration generating unit 200 may be coupled to the through the coupling member 300f having resilience.

Referring to FIG. 17 (b), the band unit 100 may include a connecting member 101 connecting band unit 100 to another band unit. The connecting member 10 may be located to correspond to the coupling member 300f coupling the band unit 100 and the vibration generating unit 200 to each other.

Referring to FIG. 17 (c), the band unit 100 may further include a spring 300g coupling one surface on which the vibration generating unit 200 comes into contact with the user's body to the other surface facing the one surface. Referring to FIG. 17 (d), the band unit 100 may further include a protrusion 102 extending toward the other surface of the vibration generating unit 200. Referring to FIG. 17 (e), the vibration generating unit 200 may include a plurality of holes 202 which are passageways allowing the air to enter or leave, thereby suppressing the vibration from being transferred to the band unit 100.

Figure 18:
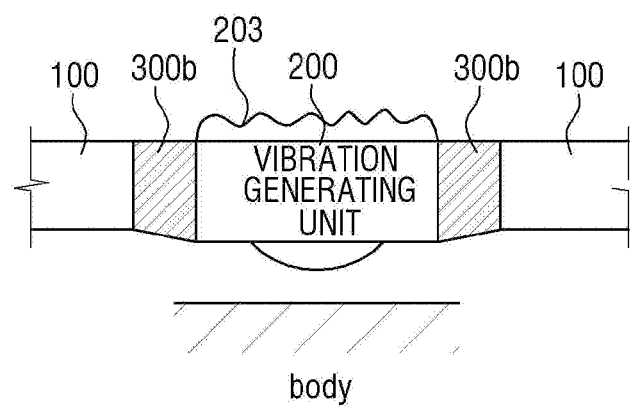

Referring to FIG. 18, the vibration generating unit 200 may include one surface coming into contact with the user's body and the other surface facing the one surface. The vibration generating unit 200 may further include a shaft 203 disposed on the other surface of the vibration generating unit 200. The shaft 203 is disposed on the other surface of the vibration generating unit 200 and may offset sounds generated by the vibration generated by the vibration generating unit 200.

Figure 19A:
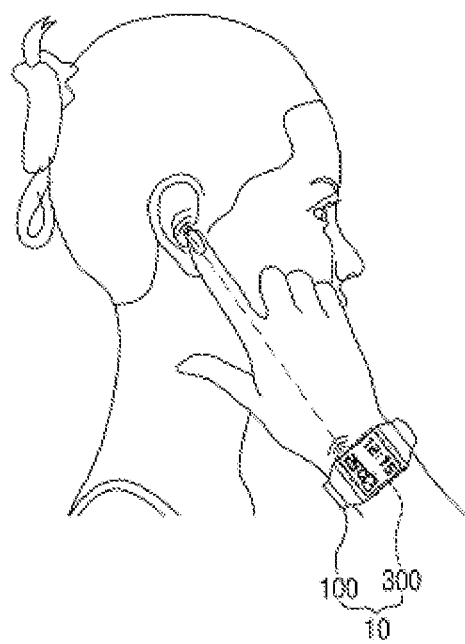
FIG. 19A and FIG. 19B are a diagram illustrating a method for driving a wearable device according to an embodiment of the present invention.
Figure 19B:
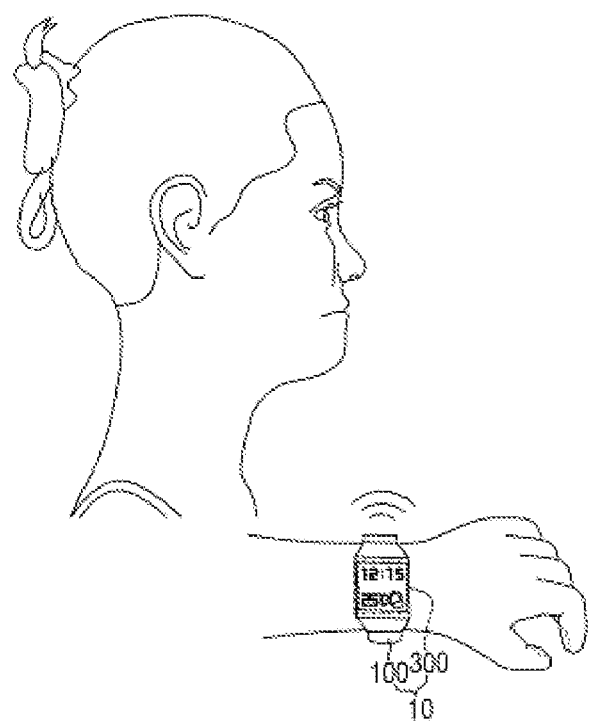

FIG. 19A and FIG. 19B are a diagram illustrating a method for driving a wearable device according to an embodiment of the present invention. In FIG. 19A and FIG. 19B, the method for driving the wearable device 10 according to an embodiment of the present invention will be described with regard to a case where the wearable device 10 is worn on a user's wrist.

The motion recognition unit 150 may generate one of first motion information and second motion information based on user's motion. In more detail, in a case where the user raises his/her arm, like in FIG. 19A, the motion recognition unit 150 may generate the first motion information and may provide a control unit 110 with the generated first motion information. Not only in the case where the user takes such a motion as shown in FIG. 19A but also in a case where the user takes a motion similar to the motion shown in FIG. 19A, the motion recognition unit 150 may generate the first motion information and may provide the control unit 110 with the generated first motion information. In this case, the vibration may be transferred by the user's body.

Conversely, in a case where the user lowers his/her arm, like in FIG. 19B, the motion recognition unit 150 may generate the second motion information and may provide the control unit 110 with the generated second motion information. Not only in the case where the user takes such a motion as shown in FIG. 19B but also in a case where the user takes a motion similar to the motion shown in FIG. 19B, the motion recognition unit 150 may generate the second motion information and may provide the control unit 110 with the generated second motion information. When the control unit 110 receives the second motion information, it may provide the audio I/O unit 140 with a second signal S2. Accordingly, the audio I/O unit 140 may provide a voice corresponding to the second signal S2 to the outside. The user may hear the voice provided through the audio I/O unit 140.

Meanwhile, the motion sensing operation performed by the motion recognition unit 150 may be switched on/off under the user's control. When the motion sensing operation is switched off, the control unit 110 may provide the vibration generating unit 200 with the second signal S2, as described above, without receiving motion information from the motion recognition unit 150.

Figure 20:
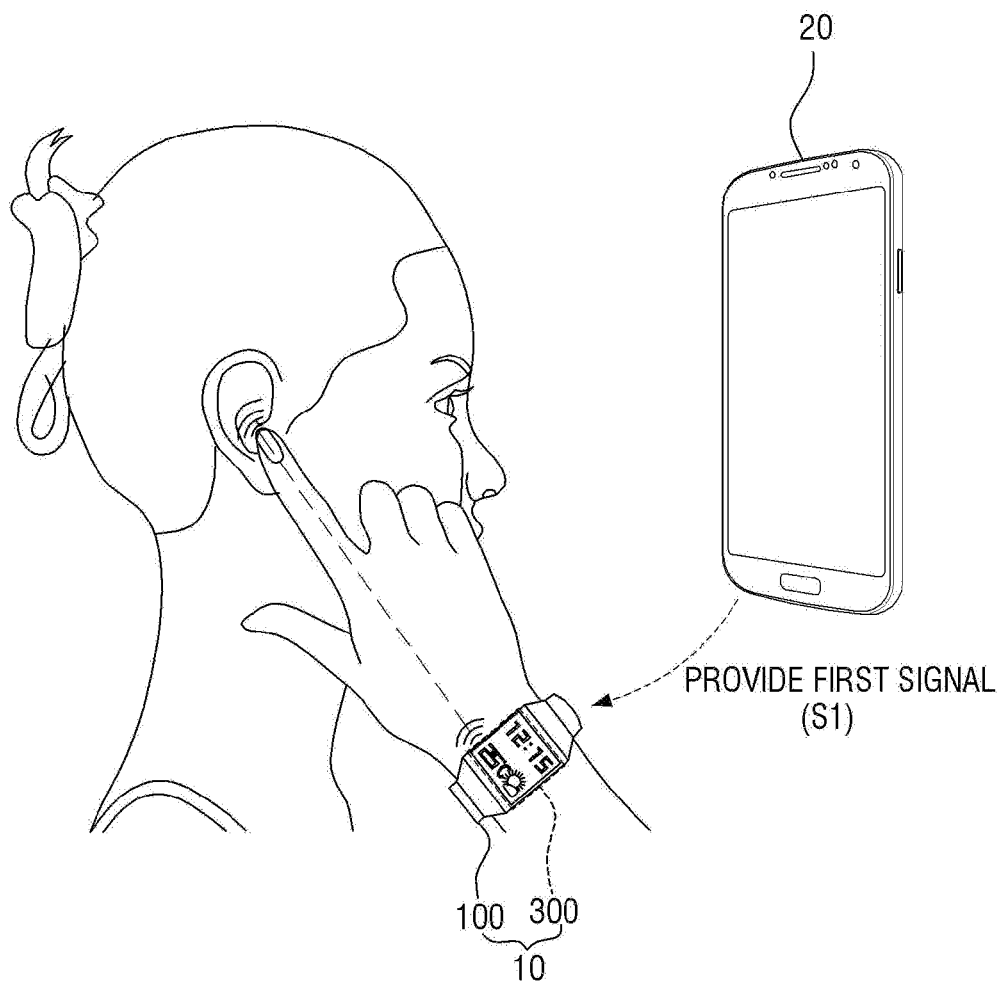
FIG. 20 is a diagram illustrating a wearable device system according to an embodiment of the present invention.

FIG. 20 is a diagram illustrating a wearable device system according to an embodiment of the present invention and FIG. 21 is a diagram illustrating a method for operating the wearable device system shown in FIG. 20. In the following description, compared to the embodiments shown in FIGS. 1 to 19, the repeated content will not be given.

Referring to FIGS. 20 and 21, the wearable device system according to an embodiment of the present invention may include a wearable device 10 and a wireless communication device 20.

The wearable device 10 may be worn on the user's body, specifically, the user's wrist. The type of the wireless communication device 20 is not particularly limited, so long as it can transmit or receive data to or from the wearable device 10 through wireless communication. That is to say, the wireless communication device 20 may include, for example, a smart phone or a tablet PC, a server or other wearable devices.

The wearable device 10 may transmit/receive data to/from the wireless communication device 20 using a predetermined communication method. In more detail, the predetermined communication method may include wi-fi, bluetooth, Zigbee, global positioning System (GPS), cellular communication, including long term evolution (LTE), LTE Advanced (LTE-A), code division multiple access (CDMA), wideband-CDMA (WDCMA), universal mobile telecommunications system (UMTS), wireless Broadband (WiBro), and global system for mobile communications (GSM), and near field communication (NFC).

The wearable device 10 may receive a first signal S1 from the wireless communication device 20 (S100). In an exemplary embodiment, the first signal S1 may be a voice signal. Thereafter, the wearable device 10 may determine an amplification extent of the received first signal S1 and may generate a second signal S2 based on the determined amplification extent (S110). The wearable device 10 may generate a vibration corresponding to the second signal S2 (S120), and may apply the generated vibration to the user's body. In an exemplary embodiment, the user may lay his/her finger on the ear, specifically on the cartilage, and may hear the sound corresponding to the first signal S1.

FIG. 22 is a diagram illustrating an embodiment for determining an amplification extent of a first signal shown in FIG. 21.

Referring to FIG. 22, as described above with reference to FIGS. 8 to 10, the amplification extent of the first signal S1 may be based on the user information. The user information may be acquired by the user directly measuring the user information. In this case, the wireless communication device 20 may function as a receiver. To this end, the wireless communication device 20 may include a control unit 21, a vibration sensing unit 22 and a communication unit 23.

In an exemplary embodiment, the user may wear the wearable device 10 according to an embodiment of the present invention on his/her wrist and a user' finger may be brought into contact with the wireless communication device 20. In more detail, the user may lay his/her finger on a portion of the wireless communication device 20 where the vibration sensing unit 22 is positioned. Then, the wearable device 10 may generate a vibration and may provide the wireless communication device 20 with the generated vibration through the user's body (a).

The wireless communication device 20 may sense the vibration through the vibration sensing unit 22 to generate sensing information and may provide the control unit 21 with the generated sensing information (b). The control unit 21 may provide the communication unit 23 with the sensing information. The wireless communication device 20 may perform wireless communication with the communication unit 120 of the wearable device 10 through the communication unit 23, thereby providing the communication unit 120 of the wearable device 10 with the sensing information (c). Based on the sensing information and an intensity of the vibration initially provided through the vibration generating unit 200, the control unit 110 may calculate a frequency response for the user. In such a manner, the control unit 110 may generate user information to then provide the memory unit 170 with the generated user information.

The control unit 110 may determine the amplification extent of the first signal S1 using the user information stored in the memory unit 170 through the above-described process.

Meanwhile, the wearable device 10 according to an embodiment of the present invention may also perform a user authentication procedure through the above-described process. That is to say, the wearable device 10 may compare the user information stored in the memory unit 170 with the user information directly measured by the user who is currently putting on the wearable device 10 to confirm whether the stored user information is identical with the measured user information, thereby performing the user authentication procedure.

Although the foregoing embodiments have been described to practice the wearable device of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

What is claimed is:

1. A wearable device system comprising:
a wearable device worn on a user's body; and
a wireless communication device providing the wearable device with a first signal,
wherein the wearable device comprises:
a band unit determining an amplification extent of the first signal and generating a second signal based on the determined amplification extent; and
a vibration generating unit coupled to the band unit, receiving the second signal and providing the user's body with a vibration corresponding to the second signal,
wherein the band unit determines the amplification extent of the first signal based on user information, and the user information includes at least one of user's sex, height, weight, finger length and wrist-to-finger length.

2. The wearable device system of claim 1, wherein the first signal is a voice signal.

3. The wearable device system of claim 1, wherein the wearable device is worn on the wrist of the user's body and the vibration generating unit provides the user's wrist with the vibration.

4. The wearable device system of claim 1, wherein the wearable device further comprises a coupling member coupling the band unit and the vibration generating unit to each other.

5. The wearable device system of claim 4, wherein the coupling member includes a plurality of support units having resilience.

6. The wearable device system of claim 4, wherein the band unit further includes a groove portion in which the vibration generating unit and the coupling member are accommodated and the coupling member has resilience.

7. The wearable device system of claim 1, wherein the wearable device applies a predetermined vibration to a part of the user's body through the vibration generating unit, and the wireless communication device being in contact with another part of the user's body senses the predetermined vibration applied from the wearable device and generates sensing information.

8. The wearable device system of claim 7, wherein the wearable device receives the sensing information from the wireless communication device and determines the amplification extent.

9. The wearable device system of claim 1, further comprising:
a first transform unit performing discrete fourier transform (DFT) on the first signal;
an amplification unit obtaining a gain value based on the user information, applying the gain value to the DFT performed first signal and generating a third signal; and
a second transform unit performing an inverse discrete fourier transform (IDFT) on the third signal and generating the second signal.

10. The wearable device system of claim 1, further comprising a memory unit storing the user information.

11. The wearable device system of claim 1, wherein the band unit further comprises an audio input/output (I/O) unit inputting external sound or outputting sound to the outside.

12. The wearable device system of claim 11, wherein the band unit further comprises a vibration sensing unit sensing an external vibration and sets the user information based on a sound input through the audio I/O unit and the vibration sensed by the vibration sensing unit.

13. A method for controlling a wearable device, the method comprising:
receiving a first signal from an external device;
determining an amplification extent of the first signal based on user information and generating a second signal based on the determined amplification extent; and
generating a vibration corresponding to the second signal,
wherein the user information includes at least one of user's sex, height, weight, finger length and wrist-to-finger length.

14. The method of claim 13, wherein the user information further includes user's age.

15. The method of claim 13, wherein the generating of the second signal comprises:
performing discrete fourier transform (DFT) on the first signal;
obtaining a gain value based on the user information, applying the gain value to the DFT performed first signal and generating a third signal; and
performing an inverse discrete fourier transform (IDFT) on the third signal and generating the second signal.

16. The method of claim 13, wherein the generating of the third signal comprises:
estimating at least one formant frequency from the first signal based on linear predictive coding;
estimating a bandwidth of the at least one formant frequency;
determining whether the voice signal is a voiced sound or an unvoiced sound;
constituting a formant enhancement filter based on the formant frequency, the formant bandwidth, the voice signal and the user information; and
generating the second signal by applying the formant enhancement filter to the first signal.

17. The method of claim 16, wherein the estimating of the formant frequency comprises:

acquiring linear predictive coding coefficients through linear predictive coding analysis;
acquiring a linear predictive coding envelop based on the linear predictive coding coefficients; and
estimating a frequency in which a slope of the linear predictive coding envelop is changed from positive to negative as the formant frequency.

18. The wearable device system of claim 1, wherein the user information further includes user's age.

* * * * *